US012809476B2

(12) United States Patent
Menashof et al.

(10) Patent No.: US 12,809,476 B2
(45) Date of Patent: Nov. 24, 2026

(54) POWER-EFFICIENT DIGITIZER ACTIVATION FOR STYLUS PEN DETECTION IN ELECTRONIC DEVICES

(71) Applicant: Microsoft Technology Licensing, LLC, Redmond, WA (US)

(72) Inventors: Roei Shlomo Menashof, Netanya (IL); Oren Istrin, Tel-Aviv (IL); Nadav Linenberg, Even Yehuda (IL); Arie Yehuda Gur, Kiryat Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/898,917

(22) Filed: Sep. 27, 2024

(65) Prior Publication Data

US 2026/0093355 A1 Apr. 2, 2026

(51) Int. Cl.
*G06F 3/041* (2006.01)

(52) U.S. Cl.
CPC ................................ *G06F 3/04162* (2019.05)

(58) Field of Classification Search
CPC ............. G06F 3/04162; G06F 3/03545; G06F 3/0441; G06F 3/0442; G06F 3/0416
See application file for complete search history.

(56) References Cited

U.S. PATENT DOCUMENTS

| | | | | |
|---|---|---|---|---|
| 6,108,727 | A | 8/2000 | Boals | |
| 2011/0130096 | A1* | 6/2011 | Dunkars | ............ G06V 30/1423 382/314 |
| 2014/0210781 | A1 | 7/2014 | Stern | |
| 2016/0162010 | A1 | 6/2016 | Mann | |
| 2018/0352437 | A1 | 12/2018 | Pratt | |
| 2020/0081560 | A1 | 3/2020 | Geller et al. | |
| 2020/0110475 | A1 | 4/2020 | Files | |
| 2021/0397342 | A1 | 12/2021 | Luo | |
| 2022/0137746 | A1 | 5/2022 | Lim | |
| 2022/0285989 | A1 | 9/2022 | Kang | |
| 2022/0382433 | A1 | 12/2022 | Nomura | |

OTHER PUBLICATIONS

Extended European Search Report Received for Application No. 25203442.6, Mar. 9, 2026, 10 Pages.

* cited by examiner

*Primary Examiner* — Lisa S Landis

(74) *Attorney, Agent, or Firm* — Holzer Patel Drennan

(57) ABSTRACT

A computing device may perform, via the one or more electrostatic antennas, a power-saving search cycle for detecting the electronic stylus devices. A computing device may, based at least in part on detecting a trigger event: cease to perform the power-saving search cycle for detecting the electronic stylus device; and perform a power-intensive search cycle for detecting the electronic stylus device, wherein an energy usage by the computing device for the power-intensive search cycle is greater than an energy usage by the computing device for the power-saving search cycle. A computing device may synchronize, based on detecting the electronic stylus device during the power-intensive search cycle, the computing device with the electronic stylus device.

20 Claims, 6 Drawing Sheets

POWER-EFFICIENT DIGITIZER ACTIVATION FOR STYLUS PEN DETECTION IN ELECTRONIC DEVICES

BACKGROUND

Conventional digitizers of computing devices utilize a search cycle to search for an active stylus device. After the stylus device is detected, the digitizer can track the position of the stylus device and report the position of the stylus.

SUMMARY

In some aspects, the techniques described herein relate to a method of synchronizing a digitizer of a computing device with an electronic stylus device using one or more electrostatic antennas of the digitizer, the method including: performing, via the one or more electrostatic antennas, a power-saving search cycle for detecting the electronic stylus devices; based at least in part on detecting a trigger event: ceasing to perform the power-saving search cycle for detecting the electronic stylus device; and performing a power-intensive search cycle for detecting the electronic stylus device, wherein an energy usage by the computing device for the power-intensive search cycle is greater than an energy usage by the computing device for the power-saving search cycle; and synchronizing, based on detecting the electronic stylus device during the power-intensive search cycle, the computing device with the electronic stylus device.

In some aspects, the techniques described herein relate to one or more tangible processor-readable storage media embodied with instructions for executing on one or more processors and circuits of a computing device a process for synchronizing a digitizer of a computing device with an electronic stylus device using one or more electrostatic antennas of the digitizer, the process including: performing, via the one or more electrostatic antennas, a power-saving search cycle for detecting the electronic stylus devices; based at least in part on detecting a trigger event: ceasing to perform the power-saving search cycle for detecting the electronic stylus device; and performing a power-intensive search cycle for detecting the electronic stylus device, wherein an energy usage by the computing device for the power-intensive search cycle is greater than an energy usage by the computing device for the power-saving search cycle; and synchronizing, based on detecting the electronic stylus device during the power-intensive search cycle, the computing device with the electronic stylus device.

In some aspects, the techniques described herein relate to a computing system for synchronizing a digitizer of a computing device with a electronic stylus device using one or more electrostatic antennas of the digitizer, the computing system including: one or more hardware processors; a search mode modifier executable by the one or more hardware processors and configured to perform, via the one or more electrostatic antennas, a power-saving search cycle for detecting the electronic stylus devices; and a stylus context detector executable by the one or more hardware processors and configured detect a trigger event, wherein the search mode modifier is further configured to: cease, based at least in part on detecting the trigger event, to perform the power-saving search cycle for detecting the electronic stylus device; and perform, based at least in part on detecting the trigger event, a power-intensive search cycle for detecting the electronic stylus device, wherein an energy usage by the computing device for the power-intensive search cycle is greater than an energy usage by the computing device for the power-saving search cycle.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTION

Figure 1:
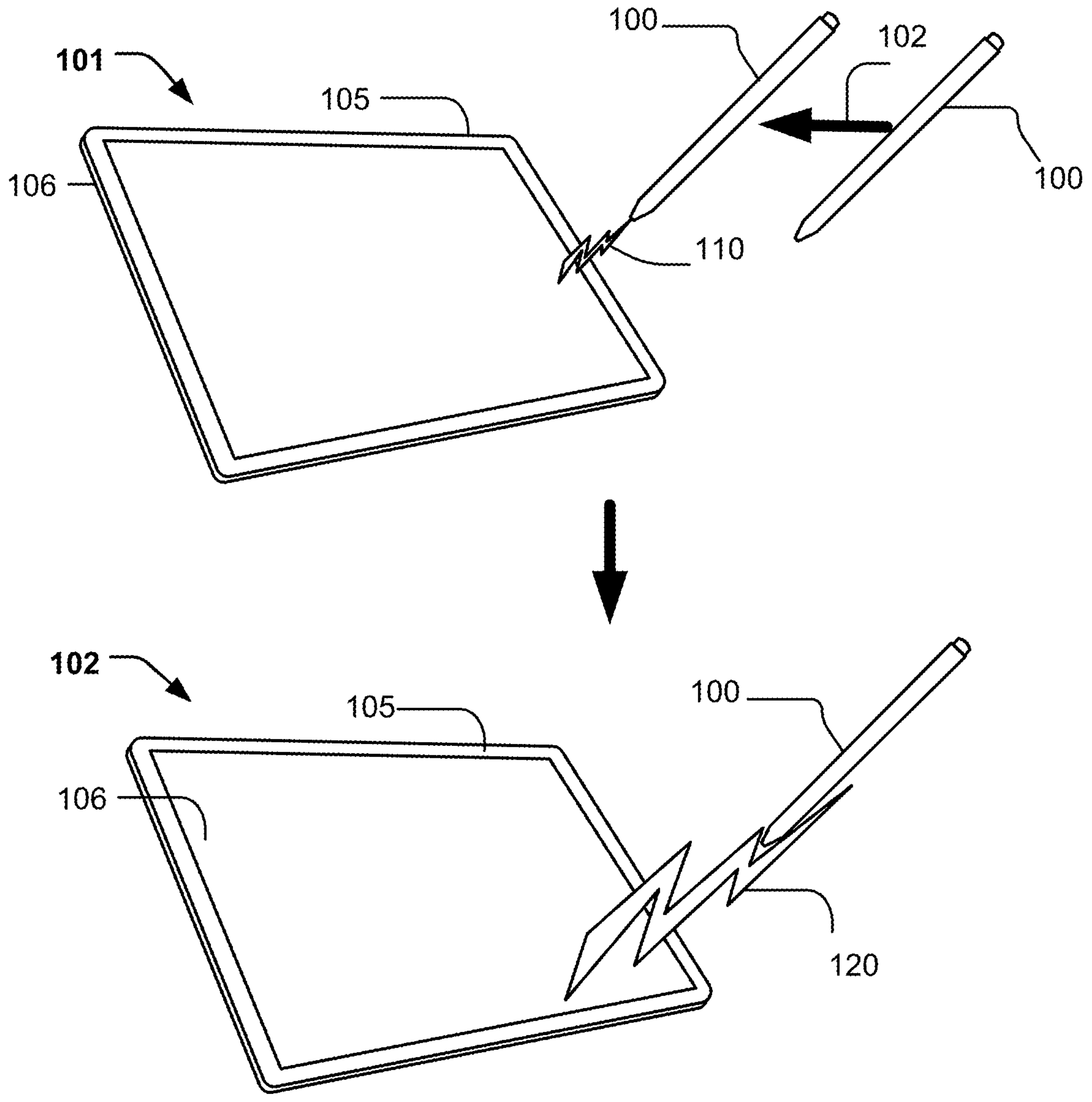
FIG. 1 illustrates an example of a digitizer of an electronic device transitioning from a power-saving search to a power-intensive search responsive to detecting a trigger event and synchronizing with an electronic stylus device.

Digitizers in conventional electronic devices continuously search for electronic stylus devices to ensure an immediate response when the electronic stylus device is brought near the digitizer. For example, the conventional digitizer repeatedly conducts a search cycle that includes several search windows for detecting electrostatic signals from the electronic stylus device. While conducting the search cycle ensures that the digitizer provides a quick response time for tracking the electronic stylus device when the user is ready to provide inputs using the stylus device (e.g., writing/drawing, selecting), performing the search cycle results in significant power consumption, particularly for users who rarely use the electronic stylus device. This continuous power drain reduces the overall battery life of the electronic device.

The described technology addresses the deficiencies of conventional approaches to searching for electronic stylus devices. The described technology provides separate power-saving and power-intensive search cycles in a digitizer for detecting an electronic stylus device, the power-saving search cycle consuming less power than the power-intensive search cycle. In some implementations of the described technology, the length of the power-saving search cycle is longer than the length of the power-intensive search cycle, and the power-saving search cycle includes longer intervals between search windows than intervals between search windows of the power-intensive search cycle. In some implementations, the power-saving search cycle includes fewer search windows per period of time than the number of search windows per the same period of time within the power-intensive search cycle. In some implementations, the power-saving search cycle includes the same number of search windows per period of time as the power-intensive search cycle, but the duration of one or more of the search windows is less for the power-saving search cycle than for the power-intensive search cycle.

In some implementations, upon detection of the occurrence of a trigger event, the digitizer ceases to perform the power-saving search cycle and instead performs the power-intensive search cycle. The trigger event may indicate that a user of the electronic stylus device intends to use the electronic stylus device. In some implementations, the trigger event is the detection of electrostatic signaling from the electronic stylus device during a search window of the power-saving search cycle. In some implementations, the trigger event is the detection, by the digitizer via a radiofrequency (RF) wireless communication channel (e.g., via Bluetooth, BLE, Wi-Fi, or other wireless communication protocol), of an identifier of the electronic stylus device. In some implementations, the trigger event is receiving, via the wireless communication channel from the electronic stylus device, data indicating a particular orientation of the electronic stylus device relative to the digitizer, data indicating a pressure applied to the electronic stylus device, data indicating an input received by or at the electronic stylus device. In some implementations, the trigger event is receiving a request on the computing device to open a particular application. The trigger events described herein are examples, and certain implementations may include other types of trigger events in addition to or instead of the trigger events described herein.

Accordingly, the described technology, which performs a power-saving search cycle until transitioning to a power-intensive search cycle responsive to a trigger event, results in reduced power consumption and extended battery life of electronic devices compared to conventional search protocols that perform only power-intensive search cycles. Particularly, when a user infrequently or seldom uses the electronic stylus device, the power savings provided by the described technology over conventional searching is substantial. For example, the described technology provides power savings compared to conventional searching methods by transitioning from the power-saving search cycle to the power-intensive search cycle only responsive to a trigger event, which indicates a likelihood that the electronic stylus device will be used to provide inputs or other data to the digitizer. Because the trigger event indicates that the user is likely to use the electronic stylus device, the digitizer will likely transition to the power-intensive search cycle to detect the electronic stylus device when the user intends to use the electronic stylus device. Accordingly, the performance of the described technology (e.g., detecting the electronic stylus device when the user uses the electronic stylus device to interact with the electronic device) does not suffer compared to conventional searching methods. A technical effect of this approach includes flexible choices for trigger events that indicate that the user is planning to use the electronic stylus device, thereby reducing power usage for detecting the electronic stylus device without sacrificing detection speed compared to conventional searching methods.

FIG. 1 illustrates an example of a digitizer of an electronic device 105 transitioning from a power-saving search 110 to a power-intensive search 120 responsive to detecting a trigger event and synchronizing with an electronic stylus device 100. The digitizer (not shown) is positioned in or near a display 106 of an electronic device 105. The digitizer includes an array of electrostatic antennas capable of communicating electrostatic signals with one or more antennas in the electronic stylus device 100. In one implementation, the electronic stylus device 100 includes an electrostatic antenna at an inking tip end and another electrostatic antenna at an eraser end. However, the specific placement of electrostatic antennas can vary in different implementations. In addition, the electronic stylus device 100 can include more or less than two electrostatic antennas.

At step 101, the electronic device 105 performs a power-saving search 110 and detects a trigger event of the electronic stylus device 100. In some implementations, the power-saving search 110 includes a number of stylus device search windows. During each search window, the digitizer of the electronic device 105 attempts to communicate electrostatically with any devices within a predefined proximity appropriate for electrostatic communication. For example, during the search window, the digitizer may detect the electronic stylus device 100 if the electronic stylus device 100 is within the predefined proximity of the digitizer. The lightning bolt of the power-saving search 110 depicted in FIG. 1 represents an attempt by the digitizer to electrostatically detect the electronic stylus device 100 during the stylus device search windows of the search cycle of the power-saving search.

The power-saving search 110 may include other windows in addition to the stylus device search windows, for example, one or more touch track search windows for detecting a touch input to the digitizer. For example, the digitizer can detect touch inputs, which include pressure applied to one or more locations on the digitizer by a finger or other object.

The electronic device 105 performs the power-saving search 110 using the digitizer until the electronic device 105 detects a trigger event. For example, performing the power-saving search 110 includes continuously repeating the search cycle of the power-saving search 110. For example, the electronic device 105 may repeat the search cycle of the power-saving search 110 until the electronic device 105 detects the trigger event or until the electronic device 105 otherwise detects the electronic stylus device 100 during a stylus device search window of the power-saving search 110.

In certain implementations, the trigger event involves detecting the electronic stylus device 100 during the power-saving search 110. In certain implementations, detecting the trigger event includes detecting a particular orientation of the electronic stylus device 100 in relation to the digitizer (e.g., parallel to the digitizer vs. perpendicular or other specific orientation to the digitizer that indicates an intent to use the electronic stylus device 100) or in relation to the electronic stylus device 100 itself (e.g. a starting orientation vs an orientation tilted a threshold amount from the starting orientation). In certain implementations, detecting the trigger event includes detecting the movement of the electronic stylus device 100, a movement of the electronic stylus device 100 for greater than a threshold amount of time (e.g., one second, two seconds, five seconds, or other threshold amount of time), a specific movement (e.g., shaking, twirling, sliding, or other movement) of the electronic stylus device 100, a movement of the electronic stylus device 100 at a velocity greater than a threshold or at a velocity within a defined velocity range, a movement of the electronic stylus device 100 to within less than a threshold distance of the digitizer, or other trigger event. A technical benefit of this approach includes flexible choices for trigger events that provide clear indications that the user is planning to use the stylus device, thereby reducing power usage for detecting the stylus device without sacrificing detection speed compared to conventional searching methods.

In implementations where the trigger event involves a movement (e.g., a velocity greater than a threshold, a velocity within a predefined range, etc.) and/or change in position/orientation of the electronic stylus device 100, detecting the trigger event includes receiving positioning information of the electronic stylus device 100 from the electronic stylus device 100 via a wireless communication channel (e.g., Bluetooth, BLE, Wi-Fi, or another wireless communication channel) and determining the movement, velocity, and/or orientation of the electronic stylus device 100 based on the positioning information. The positioning information may include accelerometer data or other sensor data logged by the electronic stylus device 100. In some implementations, the positioning information can include information received from multiple electrostatic antennas. For example, an orientation of the electronic stylus device 100 may be determined by comparing positioning information received from an electrostatic antenna at a pen end of the electronic stylus device 100 to positioning information received from an electrostatic antenna at an eraser end of the same electronic stylus device 100.

In some implementations, the trigger event involves receiving a device identifier of the electronic stylus device 100 detected via a wireless communication channel (e.g., via Bluetooth, BLE, Wi-Fi, or another wireless communication channel) and detecting the trigger event includes detecting the device identifier (e.g., MAC address or other device identifier) of the electronic stylus device 100 via the wireless communication channel.

In some implementations, the trigger event involves detecting an input received at the electronic stylus device 100. For example, the electronic device 105 receives, via a wireless communication channel between the electronic device 105 and the electronic stylus device 100, information indicating that the input was received at the electronic stylus device 100. For example, the input may be a user pressing a button on the electronic stylus device 100 or otherwise interacting with the electronic stylus device 100. Responsive to receiving the input, the electronic stylus device 100 may communicate the information indicating that the input was received by the electronic device 105 via the wireless communication channel.

In some implementations, detecting the trigger event involves detecting an input received at the electronic device 105, for example, receiving an input from a user opening a specific application (e.g., a drawing application, an electronic book reader application, or another application that likely will involve use of the electronic stylus device 100, etc.) on the electronic device 105.

At step 102, the electronic device 105 performs a power-intensive search 120 responsive to detecting the trigger event of the electronic stylus device 100. In some implementations, the power-saving search 110 includes a number of stylus device search windows. During each search window, the digitizer of the electronic device 105 attempts to communicate electrostatically with any devices within a predefined proximity that is feasible for electrostatic communication. For example, during the search window, the digitizer may detect the electronic stylus device 100 if the electronic stylus device 100 is within the predefined proximity of the digitizer. In some implementations, the electronic device 105 repeats the power-intensive search 120 to detect the electronic stylus device 100 repetitively. In some implementations, the digitizer ceases performing the power-intensive search 120 and performs a synchronization cycle with the electronic stylus device 100. For example, the synchronization cycle includes search windows that occur at a greater frequency than the frequency of search windows of the power-intensive search 120. In some implementations, during each power-intensive search window, the digitizer determines whether the signal strength of the detected signal of the electronic stylus device 100 is above a predefined threshold signal strength. If the detected signal exceeds the predefined signal strength, the digitizer transitions from the power-intensive search 120 to the synchronization cycle.

The lightning bolt of the power-intensive search 120 depicted in FIG. 1 represents an attempt by the digitizer to electrostatically detect the electronic stylus device 100 during the stylus device search windows of the search cycle of the power-intensive search 120. The difference in relative sizes of the lighting bolts of the power-intensive search 120 and the power-saving search 110 represent a difference in power usage between these searches. For example, the power-intensive search 120 consumes more power than the power-saving search 110.

In some implementations, the power-saving search 110 includes search windows performed at a first interval, and the power-intensive search 120 includes stylus device search windows performed at a second interval that is less than the first interval. For example, an interval (e.g., the first interval, the second interval) is the amount of time between the beginning of a search window and the beginning of the subsequent (or previous) search window. For example, the first interval may be one thousand (1000) microseconds, and the second interval may be five hundred (500) microseconds. In these implementations, transitioning from the power-saving search 110 to the power-intensive search 120 includes decreasing the interval between stylus device search windows.

For example, the power-saving search 110 is a first search cycle including a number (e.g., four, two, ten, or another first number) of stylus device search windows performed at a first interval (e.g., 1000 microseconds or another first interval) and the power-intensive search 120 is a second search cycle including the number of stylus device search windows performed at a second interval (e.g., 500 microseconds or another second interval) that is less than the first interval.

In some implementations, a subset (e.g., one or more but less than all) of intervals between stylus device search windows of power-intensive search 120 is decreased relative to the corresponding subset of intervals between the stylus device search windows of the power-saving search 110.

In some implementations, the power-saving search 110 includes search windows of a first duration, and the power-intensive search 120 includes stylus device search windows of a second duration greater than the first duration. For example, the first duration may be two hundred (200) microseconds, and the second duration may be four hundred (400) microseconds. In these implementations, transitioning from the power-saving search 110 to the power-intensive search 120 includes increasing the duration of one or more of a set of stylus device search windows of a search cycle. For example, the power-saving search 110 is a first search cycle including a number (e.g., four, two, ten, or another first number) of stylus device search windows of a first duration (e.g., 200 microseconds or another first duration) and the power-intensive search 120 is a second search cycle including the number of stylus device search windows of a second duration (e.g., 400 microseconds or another second duration) that is greater than the first duration. In another example, the duration of each of a subset (e.g., one or more but less than all) of the stylus device search windows of the power-intensive search 120 is increased relative to the duration of each of the corresponding subset of the stylus device search windows of the power-saving search 110. A technical benefit of this approach includes flexible choices for search windows to reduce the power usage required for detecting the stylus device without sacrificing detection speed compared to conventional searching methods.

In some implementations, the power-saving search 110 includes a number of stylus device search windows, and the power-intensive search 120 includes more stylus device search windows than the number. For example, a search cycle of the power-saving search 110 may include a first number (e.g., two) of stylus device search windows, and a search cycle of the power-intensive search 120 may include a second number (e.g., four) of stylus device search windows that is greater than the first number. In these implementations, transitioning from the power-saving search 110 to the power-intensive search 120 includes increasing the number of stylus device search windows within the search cycle.

In some implementations, transitioning from the power-saving search 110 to the power-intensive search 120 may include one or more of decreasing intervals between one or more successive stylus device search windows relative to the power-saving search, increasing the duration of one or more of the stylus device search windows relative to the power-saving search, or increasing the number of the stylus device search windows relative to the power-saving search.

In some implementations, the electronic device 105 electrostatically detects the electronic stylus device 100 during the power-intensive search 120. For example, the electronic stylus device 100 is moved to within a proximity of the digitizer (e.g., as illustrated in FIG. 1 using an arrow) such that the digitizer may electrostatically detect the electronic stylus device 100 during one or more stylus device search windows of the search cycle of the power-intensive search 120. Responsive to detecting the electronic stylus device 100, an electrostatic communication channel is established with the electronic stylus device 100. The digitizer and the electronic stylus device 100 may communicate via the electrostatic communication channel. In some scenarios, the electrostatic communication channel may be lost due to the movement of the electronic device 105, the movement of the electronic stylus device 100, an electrostatic interference, or other factor that results in a loss of the electrostatic communication channel. The electronic device 105 may continue to perform the power-intensive search 120 to re-detect the electronic stylus device 100 so that the electrostatic communication channel can be re-established.

In some implementations, after detecting the electronic stylus device 100 during the power-intensive search 120, the digitizer synchronizes with the electronic stylus device 100 via the electrostatic communication channel established between the digitizer and the electronic stylus device 100. For example, synchronizing involves synchronizing a clock of the electronic device 105 and a clock of the electronic stylus device 100. In certain implementations, the synchronization process is performed periodically to correct for any drift between the clocks of the electronic device 105 and the electronic stylus device 100. The digitizer enters a tracking mode in certain implementations, responsive to synchronizing with the electronic stylus device 100. The tracking mode may involve receiving, via the electrostatic communication channel, positioning data from the electronic stylus device 100 and tracking the position of the electronic stylus device 100 relative to the digitizer based on the received positioning data. In some implementations, if the electronic stylus device 100 is moved from within a threshold distance to the digitizer, the digitizer fails to detect the electronic stylus device 100 and transitions from synchronization to power-intensive search 120. In some implementations, after a threshold amount of time passes (e.g., 1 day, 1 hour, or another threshold amount of time) without detecting electronic stylus device 100 using the power-intensive search 120, the digitizer transitions from performing the power-intensive search 120 to performing the power-saving search 110.

Figure 2:
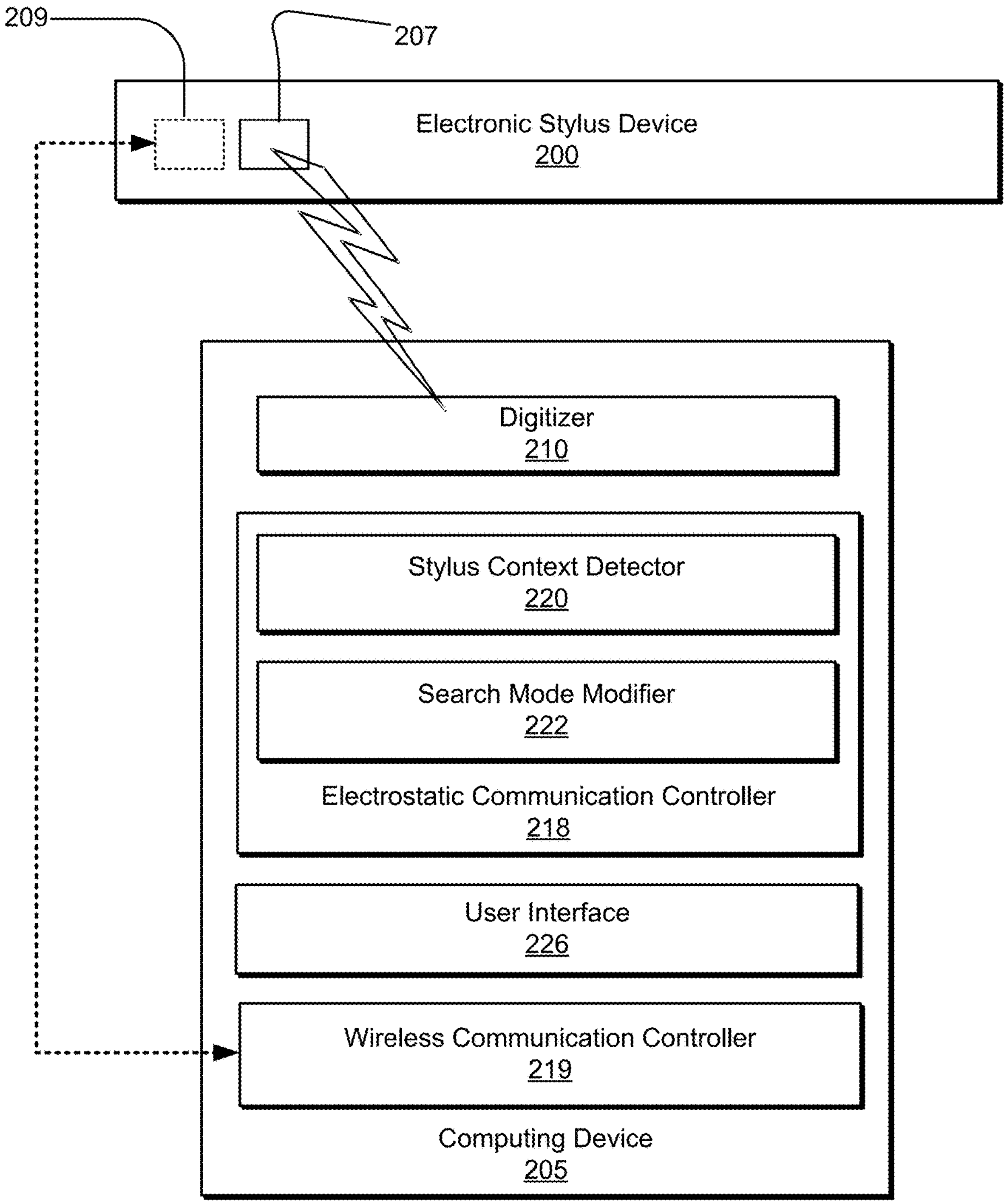
FIG. 2 illustrates an example of a digitizer communicating with electronic stylus device 200 upon detecting the electronic stylus device.

FIG. 2 illustrates an example of a digitizer communicating with electronic stylus device 200 upon detecting the electronic stylus device 200. In certain implementations, the electronic computing device 205 includes a digitizer 210, an electrostatic communication controller 218, a wireless communication controller 219, and a user interface 226.

In the illustrated implementation, the electronic stylus device 200 includes an electrostatic antenna 207. In some implementations, the electronic stylus device 200 includes an electrostatic antenna in the inking tip end of the electronic stylus device 200 and an electrostatic antenna in the eraser end of the electronic stylus device 200. In some implementations, the electronic stylus device 200 includes a single electrostatic antenna, two electrostatic antennas, three electrostatic antennas, or another number of electrostatic antennas.

In some implementations, the electronic stylus device 200 includes an antenna 209 that can facilitate the creation of a Bluetooth communication channel, BLE communication channel, Wi-Fi communication channel, or other wireless communication channel between the electronic stylus device 200 and the electronic computing device 205. In certain implementations, the trigger event that triggers a transition of the digitizer from the power-saving search to the power-intensive search involves the electronic stylus device 200 transmitting to the electronic computing device 205 via the wireless communication channel, an electronic stylus device 200 identifier.

The electrostatic communication controller 218 can control searching for and detecting the electronic stylus device 200, synchronizing with the electronic stylus device 200, and tracking the electronic stylus device 200. The electronic communication controller 218 can execute various search cycles for detecting the electronic stylus device 200. For example, the electronic communication controller 218 may search for a transmission signal, a beacon, or a beacon pulse transmitted from the electronic stylus device 200 within one or more search cycles. Search cycles may have one or more stylus device search windows for detecting the presence of the electronic stylus device 200 and one or more touch input search windows to detect inputs received by touch (e.g., by a finger, by the electronic stylus device 200, or another object). The touch input search windows in various positions within the search cycles with respect to the stylus device search windows in order to improve the chances of detecting the beacon transmitted by the electronic stylus device 200. The digitizer 210 may initiate, using the electrostatic communication controller 218, the power-saving search cycle upon being powered on and/or a certain time period after contact with the electronic stylus device 200 is lost (or not present).

The stylus context detector 220 may detect the occurrence of the trigger event. The trigger event may include communicating with the wireless communication controller 219 to receive an electronic stylus device 200 identifier via a Bluetooth communication channel between the electronic stylus device 200 and the electronic computing device 205.

For example, in some implementations, the electronic stylus device 200 includes an antenna 209 that can facilitate wireless communication (e.g., Bluetooth, BLE, Wi-Fi, NFC, etc.) with the electronic computing device 205. The wireless communication controller 219 is one example, and communication controllers for another type of wireless communication (e.g., BLE, Wi-Fi, NFC, etc.) may be used to receive an electronic computing device identifier via a communication channel using the other type of wireless communication.

The trigger event may include a particular movement/velocity/orientation of the electronic stylus device 200, and detecting the trigger event may include receiving positioning data from the electronic stylus device 200 and determining, based on the positioning data, the particular movement/velocity/orientation of the electronic stylus device 200 based on the positioning data. The trigger event may include an input to electronic stylus device 200 (e.g., pressing a button on the electronic stylus device 200), and detecting the trigger event may include receiving, via a wireless communication channel (e.g., Bluetooth communication channel), information from the electronic stylus device 200 indicating that the electronic stylus device 200 received the input. For example, the electronic stylus device 200 may transmit the information to the electronic computing device 205, which is responsive to receiving the input.

The search mode modifier 222 may initiate a power-saving search for detecting the electronic stylus device 200. The search mode modifier 222 may cause the digitizer 210 to cease the power-saving search for detecting the electronic stylus device 200 and cause the digitizer 210 to initiate a power-intensive search for detecting the electronic stylus device 200 responsive to the stylus context detector 220 detecting the occurrence of the trigger event. The search mode modifier 222 can transition, as appropriate, the digitizer 210 between the power-saving search and the power-intensive search. In some implementations, the power-saving search has fewer stylus device search windows than the power-intensive search. In some implementations, the power-saving search has a longer duration than the power-intensive search. A technical effect of this approach includes flexible choices for power-saving search windows that reduce power usage for detecting the stylus device without sacrificing detection speed compared to conventional searching methods.

In some implementations, the digitizer 210 may transition, using the search mode modifier 222, from the power-intensive search cycle to the power-saving search cycle after a threshold amount of time (e.g., a day, an hour, five minutes, or another threshold amount of time) has passed. In some implementations, the threshold amount of time can be configured by a user of the electronic device 205.

In some implementations, after initiating a power-intensive search for detecting the electronic stylus device 200 responsive to the detection of the trigger event, the search mode modifier 222 maintains the digitizer 210 in the power-intensive search until the occurrence of a reverse trigger event. For example, the stylus context detector 220 may detect a reverse trigger event that indicates that a user of the electronic stylus device 200 no longer intends to use the electronic stylus device 200. Detecting the reverse trigger event can include detecting the electronic stylus device 200 in a particular orientation (e.g., the user places the electronic stylus device parallel to the digitizer 210. Detecting the reverse trigger event can include determining that a threshold amount of time (e.g., a day, an hour, or other configurable threshold amount of time) for performing the power-intensive search has expired. Detecting the reverse trigger event can include determining that the electronic stylus device 200 has not been detected electrostatically for a threshold amount of time (e.g., a day, an hour, or other configurable threshold amount of time).

In some implementations, the digitizer 210 may transition, using the search mode modifier 222, from the synchronization search cycle to the power-intensive search cycle (or to the power-saving search cycle) after the electronic stylus device has not been detected within a threshold amount of time.

In some implementations, the power-saving search cycle has a longer delay (e.g., 270 microseconds) for detecting the electronic stylus device 200 compared to the shorter delay (e.g., 2.5 microseconds) of the power-intensive search cycle. However, the power-saving search cycle has a lower energy usage compared to the greater energy usage of the power-intensive search cycle. As can be seen in the following table, the average power usage (AVG Power) in mW decreases as the latency of detection increases, which shows significant reduction of average power usage for using the power-saving search cycle than the power-intensive search cycle:

TABLE 1

| AVG Power in mW | Latency in Microseconds (usec) |
|---|---|
| 41.50 | 80 |
| 23.40 | 180 |
| 21.14 | 230 |
| 19.78 | 280 |
| 18.88 | 330 |
| 18.23 | 380 |
| 17.74 | 430 |
| 17.37 | 480 |
| 17.07 | 530 |
| 16.82 | 580 |

For example, the power-saving search may have a latency of 280 s and an average power usage of 19.78 mW, as indicated in Table 1, and the power-intensive search may have a latency of 80 s and an average power usage of 41.50 mW, as indicated in Table 1. In this example, the average power usage of the power-intensive search is slightly more than double the average power usage of the power-saving search.

Figure 3:
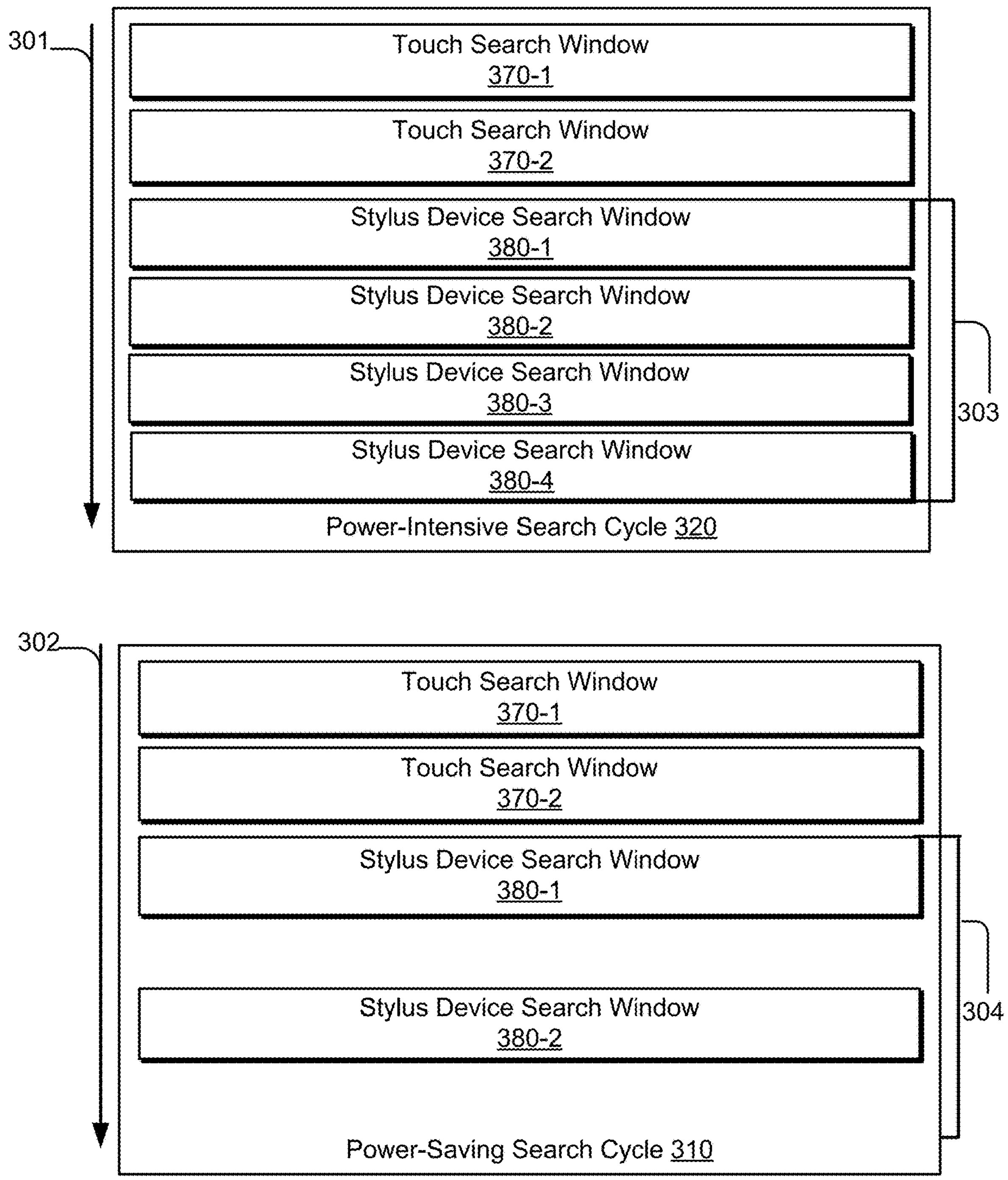
FIG. 3 illustrates an example power-intensive search cycle of a power-intensive search and an example power-saving search cycle of a power-saving search.

FIG. 3 illustrates an example power-intensive search cycle 320 of a power-intensive search and an example power-saving search cycle 310 of a power-saving search. In the example implementation of FIG. 3, the power-saving search cycle 310 has the same overall duration as the power-intensive search cycle 320 but includes a lesser number (e.g., 2) of stylus device search windows than the number (e.g., 4) of stylus device search windows in the power-intensive search cycle 320.

The example power-intensive search cycle 320 includes two touch search windows (e.g., touch search window 370-1 and touch search window 370-2) in which the digitizer attempts to detect a touch input to the digitizer electrostatically. The power-intensive search cycle 320 also includes four stylus device search windows (e.g., stylus device search window 380-1, stylus device search window 380-2, stylus device search window 380-3, stylus device search window 380-4) in which the digitizer attempts to detect an electronic stylus device electrostatically. As shown by the arrow 301, which marks the duration of the power-intensive search cycle 320, each of the two touch search windows is executed, followed by each of the four stylus device search windows. The power-intensive search cycle 320 may include further touch search windows or stylus device search windows not depicted in FIG. 3 that may occur before and/or after the example search windows depicted in FIG. 3. After the power-intensive search cycle 320 is completed (e.g., going from top to bottom through each search window), the power-intensive search cycle 320 is repeated.

The example power-saving search cycle 310 includes the same four example search windows (e.g., touch search window 370-1, touch search window 370-2, stylus device search window 380-1, and stylus device search window 380-2) as the power-intensive search cycle 320 which are performed in succession similarly to the power-intensive search cycle 320, as shown by the arrow 302, which marks the duration of the power-saving search cycle 310, that is depicted alongside the power-saving search cycle 310. The power-saving search cycle 310 may include, similarly to the power-intensive search cycle 320, further touch search windows or stylus device search windows not depicted in FIG. 3 that may occur before and/or after the example search windows depicted in FIG. 3. After the power-saving search cycle 310 is completed (e.g., going from top to bottom through each search window), the power-saving search cycle 310 is repeated.

As illustrated in FIG. 3, a time interval 303 over which the four stylus search windows (e.g., stylus device search window 380-1, stylus device search window 380-2, stylus device search window 380-3, and stylus device search window 380-4) in the power-saving search cycle 310 is equal to the time interval 304 over which the two stylus device search windows (e.g., stylus device search window 380-1 and stylus device search window 380-2) in the power-saving search cycle 310. Further, the duration of the power-intensive search cycle 320, indicated by arrow 301, is equal to the duration of the power-saving search cycle 310, indicated by arrow 302. Accordingly, as the power-intensive search cycle 320 is repeated over time, the frequency of stylus device search windows (e.g., the number of stylus device search windows performed per time period) is greater than the frequency of stylus device search windows in the power-saving search cycle 310. Accordingly, the operation of the power-saving search cycle 310 results in a lesser power expenditure than the operation of the power-intensive search cycle 320.

Figure 4:
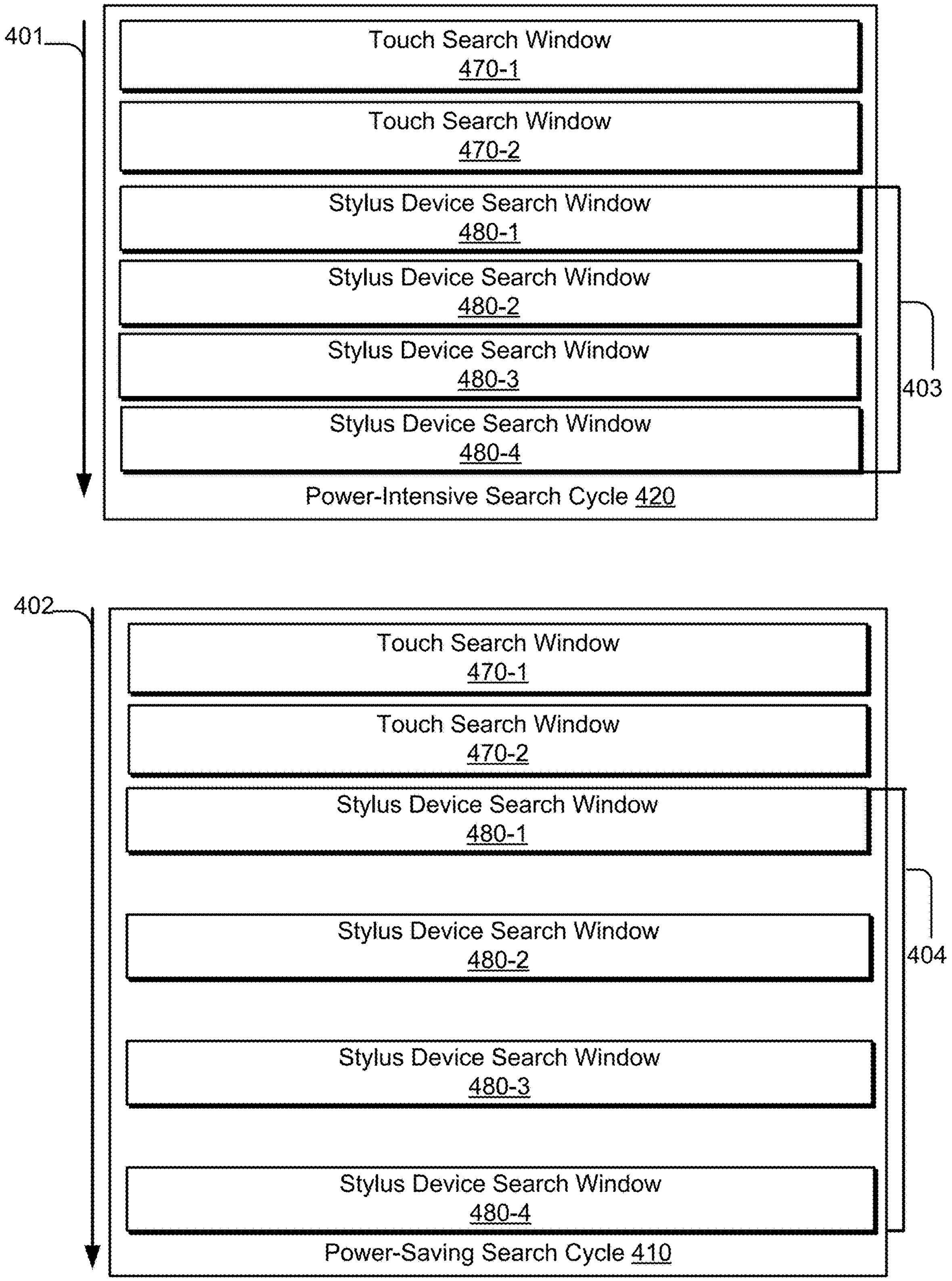
FIG. 4 illustrates an example power-intensive search cycle of a power-intensive search and an example power-saving search cycle of a power-saving search.

FIG. 4 illustrates an example power-intensive search cycle 420 of a power-intensive search and an example power-saving search cycle 410 of a power-saving search. In the example, implementation of FIG. 4, the power-saving search cycle 410 has a greater overall duration than the power-intensive search cycle 420 while including the same number (e.g., 4) of stylus device search windows as the power-intensive search cycle 420.

The example power-intensive search cycle 420 includes two touch search windows (e.g., touch search window 470-1 and touch search window 470-2) in which the digitizer attempts to detect a touch input to the digitizer electrostatically. The power-intensive search cycle 420 also includes four stylus device search windows (e.g., stylus device search window 480-1, stylus device search window 480-2, stylus device search window 480-3, stylus device search window 480-4) in which the digitizer attempts to detect an electronic stylus device electrostatically. As shown by the arrow 401, which marks the duration of the power-intensive search cycle 420, each of the two touch search windows is executed, followed by each of the four stylus device search windows. The power-intensive search cycle 420 may include further touch search windows or stylus device search windows not depicted in FIG. 4 that may occur before and/or after the example search windows depicted in FIG. 4. After the power-intensive search cycle 420 is completed (e.g., going from top to bottom through each search window), the power-intensive search cycle 420 is repeated.

The example power-saving search cycle 410 includes the same six example search windows (e.g., touch search window 470-1, touch search window 470-2, stylus device search window 480-1, stylus device search window 480-2, stylus device search window 480-3, and stylus device search window 480-4) as the power-intensive search cycle 420 which are performed in succession similarly to the power-intensive search cycle 420, as shown by the arrow 402 that is depicted alongside the power-saving search cycle 410 that marks the duration of the power-saving search cycle 410. The power-saving search cycle 410 may include, similarly to the power-intensive search cycle 420, further touch search windows or stylus device search windows not depicted in FIG. 4 that may occur before and/or after the example search windows depicted in FIG. 4. After the power-saving search cycle 410 is completed (e.g., going from top to bottom through each search window), the power-saving search cycle 410 is repeated.

As illustrated in FIG. 4, the time interval 403 of the four stylus device search windows (e.g., stylus device search window 480-1, stylus device search window 480-2, stylus device search window 480-3, stylus device search window 480-4) in the power-saving search cycle 410 is greater than the time interval 404 of the corresponding stylus device search windows in the power-intensive search cycle 420. Further, the duration of the power-intensive search cycle 420, indicated by arrow 401, is less than the duration of the power-saving search cycle 410, indicated by arrow 402. Accordingly, as the power-intensive search cycle 420 is repeated over time, the frequency of stylus device search windows (e.g., the number of stylus device search windows performed per time period) is greater than the frequency of stylus device search windows in the power-saving search cycle 410. Accordingly, the operation of the power-saving search cycle 410 results in a lesser power expenditure compared to the operation of the power-intensive search cycle 420.

Figure 5:
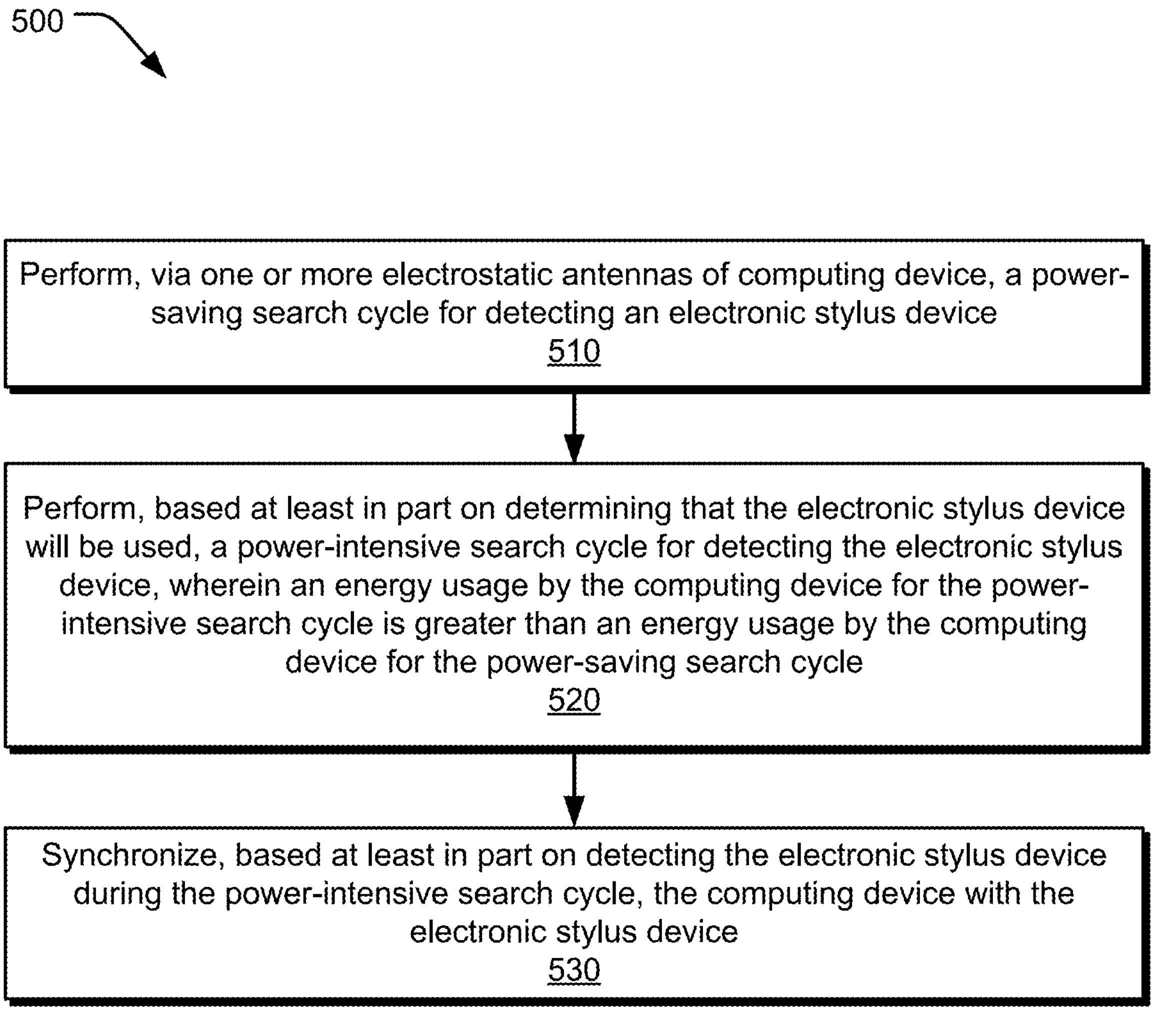
FIG. 5 illustrates a method of synchronizing a digitizer computing device with an electronic stylus device using one or more electrostatic antennas of the digitizer computing device.

FIG. 5 illustrates a method 500 of synchronizing a digitizer computing device with an electronic stylus device using one or more electrostatic antennas of the digitizer computing device. The method 500 includes a performing operation 510, a performing operation 520, and a synchronizing operation 530.

The performing operation 510 performs via one or more electrostatic antennas of the computing device, a power-saving search cycle for detecting an electronic stylus device.

The performing operation 520 performs, based at least in part on determining that the electronic stylus device will be used, a power-intensive search cycle for detecting the electronic stylus device, wherein an energy usage by the computing device for the power-intensive search cycle is greater than an energy usage by the computing device for the power-saving search cycle. In some implementations, performing the power-intensive search cycle involves ceasing to perform the power-saving search cycle. In some implementations, determining that the electronic stylus device will be used involves detecting a trigger event. In some implementations, detecting the trigger event includes detecting the electronic stylus device during the power-saving search cycle. In some implementations, detecting the trigger event includes receiving, via a radiofrequency communication channel, an identifier corresponding to the electronic stylus device. In some implementations, detecting the trigger event involves receiving, via a wireless communication channel, positioning information from the electronic stylus device and determining, based on the positioning information, the trigger event, the trigger event including one or more of a predefined orientation of the electronic stylus device, a position of the electronic stylus device within a threshold distance to the digitizer, or a velocity of the electronic stylus device that exceeds a threshold velocity.

In some implementations, the power-intensive search cycle includes a first number of stylus device search windows over a time period, the power-saving search cycle includes a second number of search windows over the time period that is less than the first number. In some implementations, the power-intensive search cycle includes a number of stylus device search windows over a first time period, the power-saving search cycle includes the number of search windows over a second time period, and the second time period is longer than the first time period.

The synchronizing operation 530 synchronizes, based at least in part on detecting the electronic stylus device during the power-intensive search cycle, the computing device with the electronic stylus device.

Figure 6:
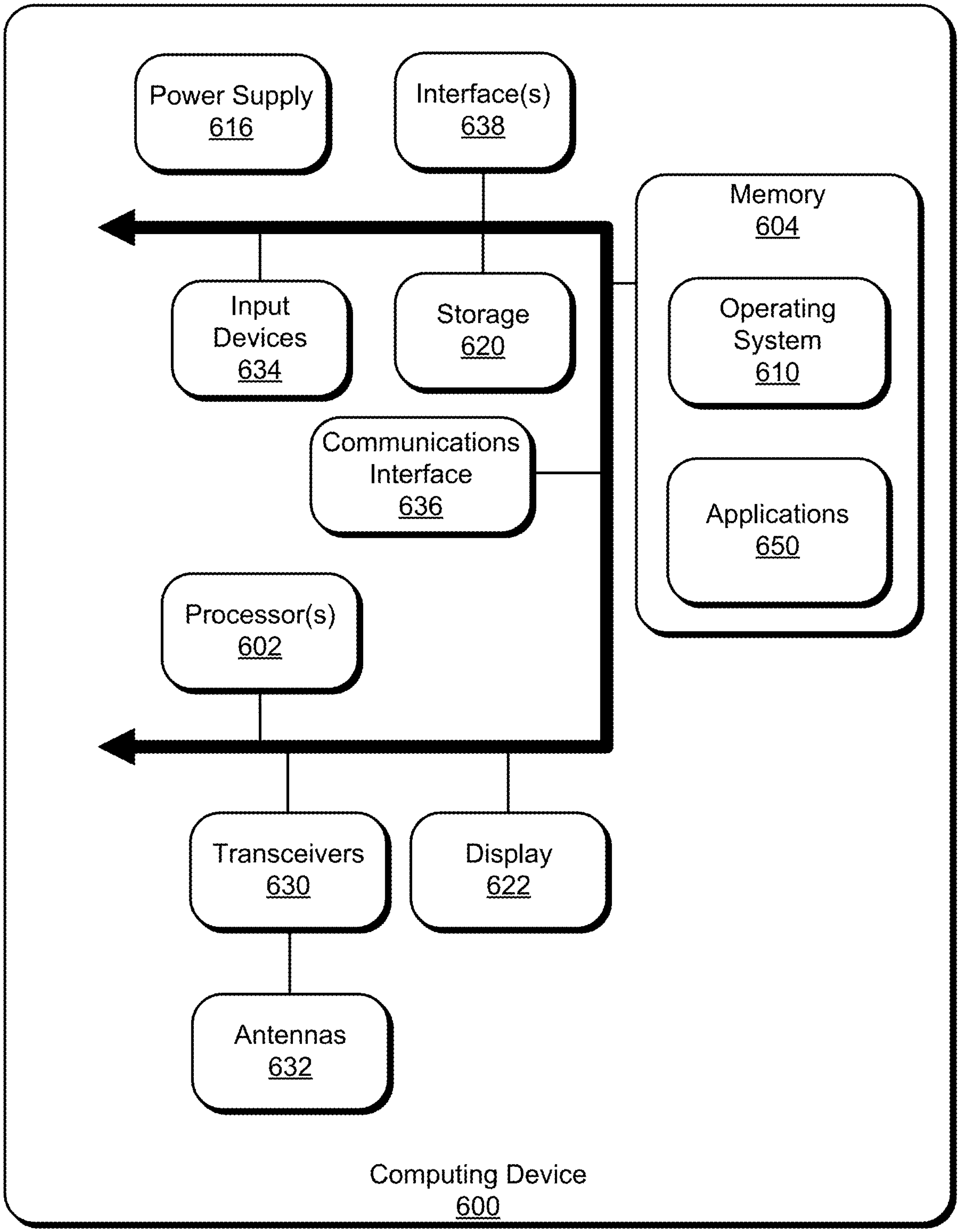
FIG. 6 illustrates an example computing device for use in implementing the described technology.

FIG. 6 illustrates an example computing device 600 for use in implementing the described technology. The computing device 600 may be a client computing device (such as a laptop computer, a desktop computer, or a tablet computer), a server/cloud computing device, an Internet-of-Things (IoT), any other type of computing device, or a combination of these options. The computing device 600 includes one or more hardware processor(s) 602 and a memory 604. The memory 604 generally includes both volatile memory (e.g., RAM) and nonvolatile memory (e.g., flash memory), although one or the other type of memory may be omitted. An operating system 610 resides in the memory 604 and is executed by the processor(s) 602. In some implementations, the computing device 600 includes and/or is communicatively coupled to storage 620.

In the example computing device 600, as shown in FIG. 6, one or more software modules, segments, and/or processors, such as a wireless communication controller, an electrostatic communication controller, a search mode modifier, a stylus context detector, applications 650, and other program code and modules are loaded into the operating system 610 on the memory 604 and/or the storage 620 and executed by the processor(s) 602. The storage 620 may store data and be local to the computing device 600 or may be remote and communicatively connected to the computing device 600. In particular, in one implementation, components of a system for classifying a dataset may be implemented entirely in hardware or in a combination of hardware circuitry and software.

The computing device 600 includes a power supply 616, which may include or be connected to one or more batteries or other power sources, and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers, client devices, IoT devices, and other computing and communications devices. The computing device 600 may further include a communications interface 636 (such as a network adapter or an I/O port, which are types of communication devices). The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard, trackpad, or mouse). These and other input devices may be coupled to the server by one or more interfaces 638, such as a serial port interface, parallel port, or universal serial bus (USB). The computing device 600 may further include a display 622, such as a touchscreen display.

The computing device 600 may include a variety of tangible processor-readable storage media and intangible processor-readable communication signals. Tangible processor-readable storage can be embodied by any available media that can be accessed by the computing device 600 and can include both volatile and nonvolatile storage media and removable and non-removable storage media. Tangible processor-readable storage media excludes intangible, transitory communications signals (such as signals per se) and includes volatile and nonvolatile, removable, and non-removable storage media implemented in any method, process, or technology for storage of information such as processor-readable instructions, data structures, program modules, or other data. In some implementations, the tangible processor-readable storage media excludes intangible, transitory communications signals (such as signals per se), but can make use of intangible, transitory communications signals. Tangible processor-readable storage media includes but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of synchronizing a digitizer of a computing device with a electronic stylus device using one or more electrostatic antennas of the digitizer, the method comprising: performing, via the one or more electrostatic antennas, a power-saving search cycle for detecting the electronic stylus devices; based at least in part on detecting a trigger event: ceasing to perform the power-saving search cycle for detecting the electronic stylus device; and performing a power-intensive search cycle for detecting the electronic stylus device, wherein an energy usage by the computing device for the power-intensive search cycle is greater than an energy usage by the computing device for the power-saving search cycle; and synchronizing, based on detecting the electronic stylus device during the power-intensive search cycle, the computing device with the electronic stylus device.

Clause 2. The method of clause 1, wherein the trigger event indicates a likelihood that the electronic stylus device will be used to provide input to the digitizer.

Clause 3. The method of clause 1, wherein detecting the trigger event includes detecting the electronic stylus device during the power-saving search cycle.

Clause 4. The method of clause 1, wherein detecting the trigger event includes receiving, via a radiofrequency communication channel, an identifier corresponding to the electronic stylus device.

Clause 5. The method of clause 1, wherein detecting the trigger event includes: receiving, via a wireless communication channel, positioning information from the electronic stylus device; and determining, based on the positioning information, the trigger event, the trigger event including one or more of a predefined orientation of the electronic stylus device, a position of the electronic stylus device within a threshold distance to the digitizer, or a velocity of the electronic stylus device that exceeds a threshold velocity.

Clause 6. The method of clause 1, wherein the power-intensive search cycle includes a first number of stylus device search windows over a time period, the power-saving search cycle includes a second number of search windows over the time period, wherein the first number is greater than the second number.

Clause 7. The method of clause 1, wherein the power-intensive search cycle includes a number of stylus device search windows over a first time period, the power-saving search cycle includes the number of search windows over a second time period, wherein the second time period is longer than the first time period.

Clause 8. One or more tangible processor-readable storage media embodied with instructions for executing on one or more processors and circuits of a computing device a process for synchronizing a digitizer of a computing device with a electronic stylus device using one or more electrostatic antennas of the digitizer, the process comprising: performing, via the one or more electrostatic antennas, a power-saving search cycle for detecting the electronic stylus devices; based at least in part on detecting a trigger event: ceasing to perform the power-saving search cycle for detecting the electronic stylus device; and performing a power-intensive search cycle for detecting the electronic stylus device, wherein an energy usage by the computing device for the power-intensive search cycle is greater than an energy usage by the computing device for the power-saving search cycle; and synchronizing, based on detecting the electronic stylus device during the power-intensive search cycle, the computing device with the electronic stylus device.

Clause 9. The one or more tangible processor-readable storage media of clause 8, wherein the trigger event indicates a likelihood that the electronic stylus device will be used to provide input to the digitizer.

Clause 10. The one or more tangible processor-readable storage media of clause 8, wherein detecting the trigger event includes detecting the electronic stylus device during the power-saving search cycle.

Clause 11. The one or more tangible processor-readable storage media of clause 8, wherein detecting the trigger event includes receiving, via a radiofrequency communication channel, an identifier corresponding to the electronic stylus device.

Clause 12. The one or more tangible processor-readable storage media of clause 8, wherein detecting the trigger event includes: receiving, via a wireless communication channel, positioning information from the electronic stylus device; and determining, based on the positioning information, the trigger event, the trigger event including one or more of a predefined orientation of the electronic stylus device, a position of the electronic stylus device within a threshold distance to the digitizer, or a velocity of the electronic stylus device that exceeds a threshold velocity.

Clause 13. The one or more tangible processor-readable storage media of clause 8, wherein the power-intensive search cycle includes a first number of stylus device search windows over a time period, the power-saving search cycle includes a second number of search windows over the time period, wherein the first number is greater than the second number.

Clause 14. The one or more tangible processor-readable storage media of clause 8, wherein the power-intensive search cycle includes a number of stylus device search windows over a first time period, the power-saving search cycle includes the number of search windows over a second time period, wherein the second time period is longer than the first time period.

Clause 15. A computing system for synchronizing a digitizer of a computing device with a electronic stylus device using one or more electrostatic antennas of the digitizer, the computing system comprising: one or more hardware processors; a search mode modifier executable by the one or more hardware processors and configured to perform, via the one or more electrostatic antennas, a power-saving search cycle for detecting the electronic stylus devices; and a stylus context detector executable by the one or more hardware processors and configured detect a trigger event, wherein the search mode modifier is further configured to: cease, based at least in part on detecting the trigger event, to perform the power-saving search cycle for detecting the electronic stylus device; and perform, based at least in part on detecting the trigger event, a power-intensive search cycle for detecting the electronic stylus device, wherein an energy usage by the computing device for the power-intensive search cycle is greater than an energy usage by the computing device for the power-saving search cycle.

Clause 16. The computing system of clause 15, wherein detecting the trigger event includes detecting the electronic stylus device during the power-saving search cycle.

Clause 17. The computing system of clause 15, wherein detecting the trigger event includes receiving, via a radiofrequency communication channel, an identifier corresponding to the electronic stylus device.

Clause 18. The computing system of clause 15, wherein the stylus context detector is configured to: receive, via a wireless communication channel, positioning information from the electronic stylus device; and determine, based on the positioning information, the trigger event, the trigger event including one or more of a predefined orientation of the electronic stylus device, a position of the electronic stylus device within a threshold distance to the digitizer, or a velocity of the electronic stylus device that exceeds a threshold velocity.

Clause 19. The computing system of clause 15, wherein the power-intensive search cycle includes a first number of stylus device search windows over a time period, the power-saving search cycle includes a second number of search windows over the time period, wherein the first number is greater than the second number.

Clause 20. The computing system of clause 15, wherein the power-intensive search cycle includes a number of stylus device search windows over a first time period, the power-saving search cycle includes the number of search windows over a second time period, wherein the second time period is longer than the first time period.

Clause 21. A system for synchronizing a digitizer of a computing device with an electronic stylus device using one or more electrostatic antennas of the digitizer, the method comprising: means for performing, via the one or more electrostatic antennas, a power-saving search cycle for detecting the electronic stylus devices; means for ceasing to perform, based at least in part on detecting a trigger event, the power-saving search cycle for detecting the electronic stylus device; and means for performing a power-intensive search cycle for detecting the electronic stylus device, wherein an energy usage by the computing device for the power-intensive search cycle is greater than an energy usage by the computing device for the power-saving search cycle; and means for synchronizing, based on detecting the electronic stylus device during the power-intensive search cycle, the computing device with the electronic stylus device.

Clause 21. The system of clause 21, wherein the trigger event indicates a likelihood that the electronic stylus device will be used to provide input to the digitizer.

Clause 23. The system of clause 21, wherein the means for detecting the trigger event includes means for detecting the electronic stylus device during the power-saving search cycle.

Clause 24. The system of clause 21, wherein the means for detecting the trigger event includes means for receiving, via a radiofrequency communication channel, an identifier corresponding to the electronic stylus device.

Clause 25. The system of clause 21, wherein the means for detecting the trigger event includes: means for receiving, via a wireless communication channel, positioning information from the electronic stylus device; and means for determining, based on the positioning information, the trigger event, the trigger event including one or more of a predefined orientation of the electronic stylus device, a position of the electronic stylus device within a threshold distance to the digitizer, or a velocity of the electronic stylus device that exceeds a threshold velocity.

Clause 26. The system of clause 21, wherein the power-intensive search cycle includes a first number of stylus device search windows over a time period, the power-saving search cycle includes a second number of search windows over the time period, wherein the first number is greater than the second number.

Clause 27. The system of clause 21, wherein the power-intensive search cycle includes a number of stylus device search windows over a first time period, the power-saving search cycle includes the number of search windows over a second time period, wherein the second time period is longer than the first time period.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed:

1. A method of synchronizing a digitizer of a computing device with an electronic stylus device using one or more electrostatic antennas of the digitizer, the method comprising:

performing, via the one or more electrostatic antennas of the digitizer, a power-saving search cycle for detecting the electronic stylus device;

based at least in part on detecting, during the performing of the power-saving search cycle, a trigger event:

ceasing to perform the power-saving search cycle for detecting the electronic stylus device; and performing a power-intensive search cycle for detecting the electronic stylus device, wherein an energy usage by the computing device for the power-intensive search cycle is greater than an energy usage by the computing device for the power-saving search cycle; and synchronizing, based on detecting the electronic stylus device during the power-intensive search cycle, the computing device with the electronic stylus device.

2. The method of claim 1, wherein the trigger event indicates a likelihood that the electronic stylus device will be used to provide input to the digitizer.

3. The method of claim 1, wherein detecting the trigger event includes detecting the electronic stylus device during the power-saving search cycle.

4. The method of claim 1, wherein detecting the trigger event includes receiving, via a radiofrequency communication channel, an identifier corresponding to the electronic stylus device.

5. The method of claim 1, wherein detecting the trigger event includes:

receiving, via a wireless communication channel, positioning information from the electronic stylus device; and determining, based on the positioning information, the trigger event, the trigger event including one or more of a predefined orientation of the electronic stylus device, a position of the electronic stylus device within a threshold distance to the digitizer, or a velocity of the electronic stylus device that exceeds a threshold velocity.

6. The method of claim 1, wherein the power-intensive search cycle includes a first number of stylus device search windows over a time period, the power-saving search cycle includes a second number of search windows over the time period, wherein the first number is greater than the second number.

7. The method of claim 1, wherein the power-intensive search cycle includes a number of stylus device search windows over a first time period, the power-saving search cycle includes the number of search windows over a second time period, wherein the second time period is longer than the first time period.

8. One or more tangible processor-readable storage media embodied with instructions for executing on one or more processors and circuits of a computing device a process for synchronizing a digitizer of a computing device with an electronic stylus device using one or more electrostatic antennas of the digitizer, the process comprising:

performing, via the one or more electrostatic antennas of the digitizer, a power-saving search cycle for detecting the electronic stylus device;

based at least in part on detecting, during the performing of the power-saving search cycle, a trigger event:

ceasing to perform the power-saving search cycle for detecting the electronic stylus device; and performing a power-intensive search cycle for detecting the electronic stylus device, wherein an energy usage by the computing device for the power-intensive search cycle is greater than an energy usage by the computing device for the power-saving search cycle; and synchronizing, based on detecting the electronic stylus device during the power-intensive search cycle, the computing device with the electronic stylus device.

9. The one or more tangible processor-readable storage media of claim 8, wherein the trigger event indicates a likelihood that the electronic stylus device will be used to provide input to the digitizer.

10. The one or more tangible processor-readable storage media of claim 8, wherein detecting the trigger event includes detecting the electronic stylus device during the power-saving search cycle.

11. The one or more tangible processor-readable storage media of claim 8, wherein detecting the trigger event includes receiving, via a radiofrequency communication channel, an identifier corresponding to the electronic stylus device.

12. The one or more tangible processor-readable storage media of claim 8, wherein detecting the trigger event includes:

receiving, via a wireless communication channel, positioning information from the electronic stylus device; and determining, based on the positioning information, the trigger event, the trigger event including one or more of a predefined orientation of the electronic stylus device, a position of the electronic stylus device within a threshold distance to the digitizer, or a velocity of the electronic stylus device that exceeds a threshold velocity.

13. The one or more tangible processor-readable storage media of claim 8, wherein the power-intensive search cycle includes a first number of stylus device search windows over a time period, the power-saving search cycle includes a second number of search windows over the time period, wherein the first number is greater than the second number.

14. The one or more tangible processor-readable storage media of claim 8, wherein the power-intensive search cycle includes a number of stylus device search windows over a first time period, the power-saving search cycle includes the number of search windows over a second time period, wherein the second time period is longer than the first time period.

15. A computing system for synchronizing a digitizer of a computing device with an electronic stylus device using one or more electrostatic antennas of the digitizer, the computing system comprising:

one or more hardware processors;

a search mode modifier executable by the one or more hardware processors and configured to perform, via the one or more electrostatic antennas of the digitizer, a power-saving search cycle for detecting the electronic stylus device; and a stylus context detector executable by the one or more hardware processors and configured to detect, during the performing of the power-saving search cycle, a trigger event, wherein the search mode modifier is further configured to:

cease, based at least in part on detecting the trigger event, to perform the power-saving search cycle for detecting the electronic stylus device; and perform, based at least in part on detecting the trigger event, a power-intensive search cycle for detecting the electronic stylus device, wherein an energy usage by the computing device for the power-intensive search cycle is greater than an energy usage by the computing device for the power-saving search cycle.

16. The computing system of claim 15, wherein detecting the trigger event includes detecting the electronic stylus device during the power-saving search cycle.

17. The computing system of claim 15, wherein detecting the trigger event includes receiving, via a radiofrequency communication channel, an identifier corresponding to the electronic stylus device.

18. The computing system of claim 15, wherein the stylus context detector is configured to:

receive, via a wireless communication channel, positioning information from the electronic stylus device; and determine, based on the positioning information, the trigger event, the trigger event including one or more of a predefined orientation of the electronic stylus device, a position of the electronic stylus device within a threshold distance to the digitizer, or a velocity of the electronic stylus device that exceeds a threshold velocity.

19. The computing system of claim 15, wherein the power-intensive search cycle includes a first number of stylus device search windows over a time period, the power-saving search cycle includes a second number of search windows over the time period, wherein the first number is greater than the second number.

20. The computing system of claim 15, wherein the power-intensive search cycle includes a number of stylus device search windows over a first time period, the power-saving search cycle includes the number of search windows over a second time period, wherein the second time period is longer than the first time period.

* * * * *